Jan. 1, 1957  F. MEYER, JR  2,775,818
FLUID GAGE APPARATUS
Filed June 26, 1953  3 Sheets-Sheet 1

INVENTOR.
FRANKLIN MEYER JR.
BY
Watson Johnson Leavenworth+Blair
ATTORNEYS

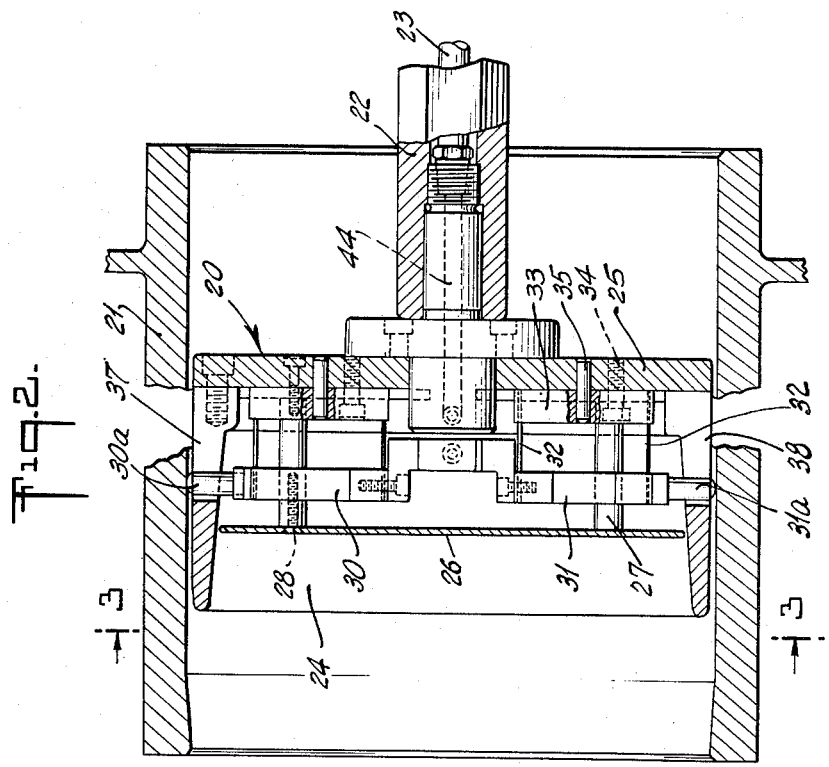
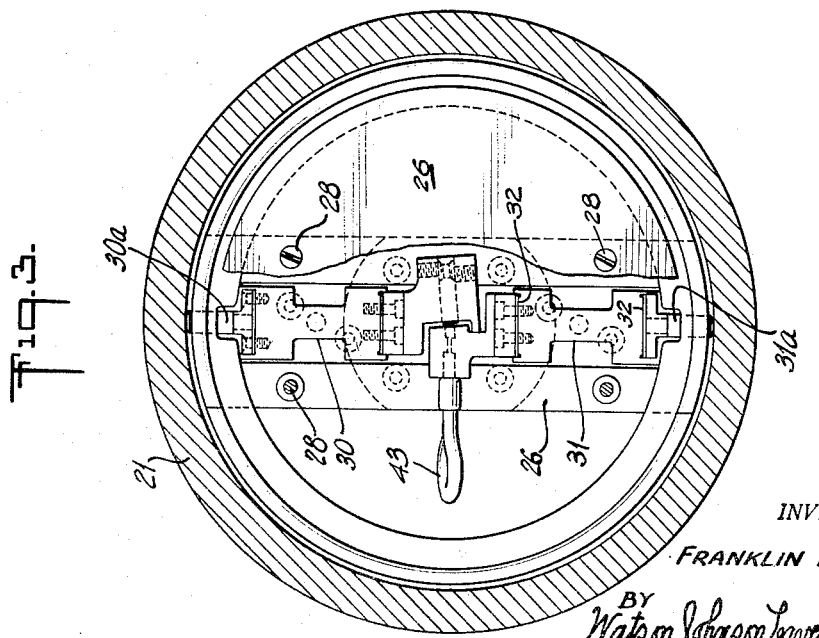

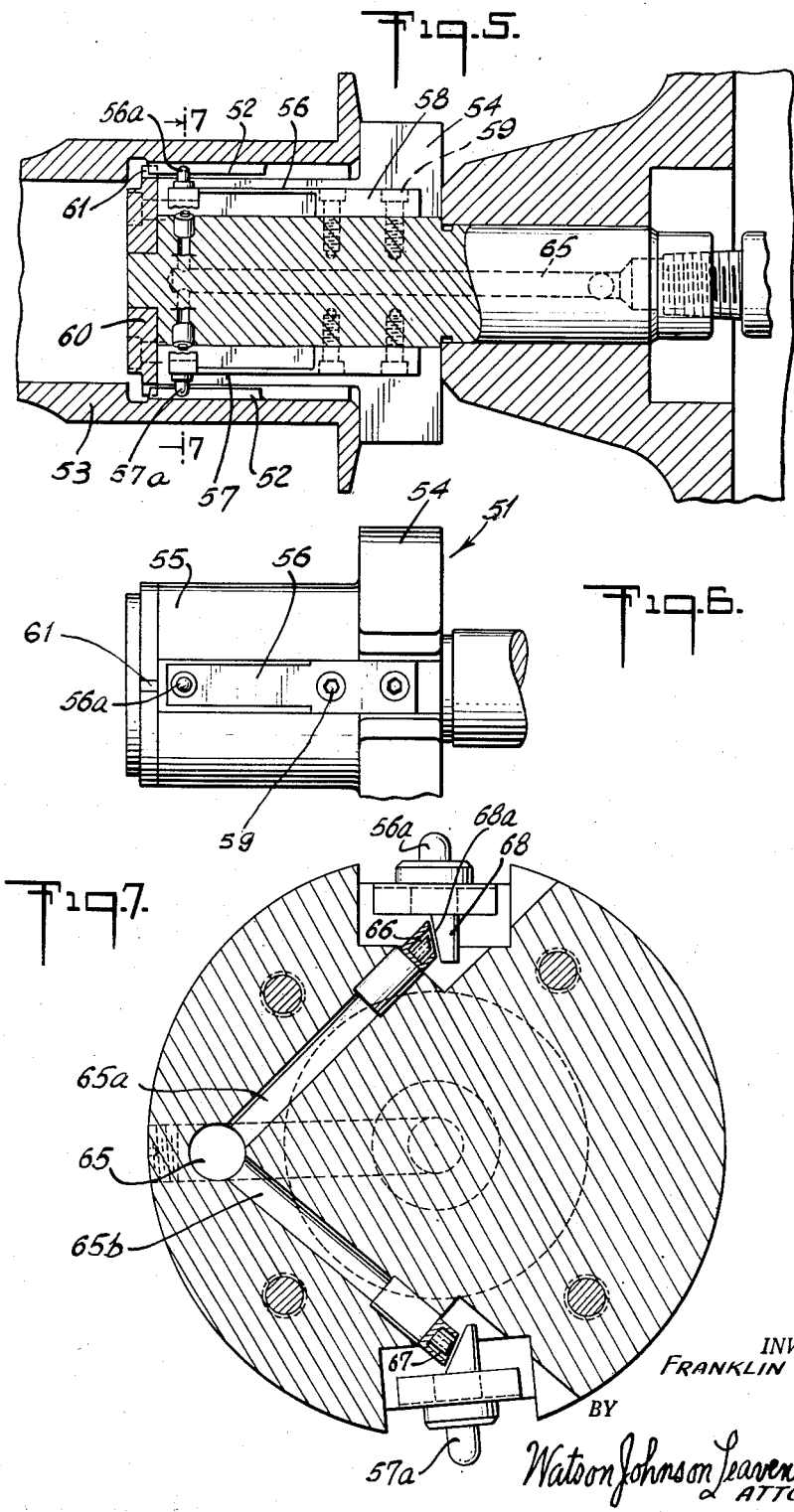

United States Patent Office 2,775,818
Patented Jan. 1, 1957

2,775,818
FLUID GAGE APPARATUS

Franklin Meyer, Jr., Forestdale, R. I., assignor to The Taft-Peirce Manufacturing Company, Woonsocket, R. I., a corporation of Rhode Island Application June 26, 1953, Serial No. 364,332

3 Claims. (Cl. 33—147)

The present invention relates to a contact type fluid gage of a character particularly adaptable for a relatively wide tolerance range in the dimensions to be measured. In general the apparatus is of the type employing the principle of fluid escape from an orifice against an opposed reference surface, variations in the dimension being measured causing variations in the space between the orifice and its reference surface with a consequent variation in the escape of the fluid, such as air, which is registered upon an indicator associated with the fluid supply line.

Direct air gaging as heretofore employed, in which variations in the dimensions produce like variations in the spacing between the nozzle escape port and the reference surface, is limited for satisfactory accuracy to a maximum tolerance range of about .008 inch. Apparatus embodying the principles of the present invention, however, render available the advantages of air gaging such as speed of indication, repeatability, linear scale readings and other characteristics with much greater tolerances as large for example as .125 inch.

A particular feature of the present invention which renders possible the described results is the embodiment of a reference surface in association with a nozzle in which the reference surface is arranged at an angle, that is, inclined to the normal direction of relative movement between the nozzle and its reference surface. With such an arrangement the space between the nozzle and its reference surface varies as the sine function of the angle of inclination rather than in direct proportion to the amount of absolute movement. The ratio of the change in spacing at the nozzle to the absolute movement is therefore a value which numerically is less than 1, and by altering the magnitude of the angle, the ratio, and therefore the degree of reduction of movement, may be selected at any desired value within reasonable limits.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 2 is a cross-sectional view in elevation of a gaging device embodying the basic elements shown in Figure 1, the gaging device being applied to the measurement of the internal bore of a cylinder;

Fig. 3 is an end view of the apparatus of Figure 2 looking from the left in accordance with the line 3—3 of Figure 2;

Fig. 5 is a diametral section through another gaging device adapted particularly for measuring the pitch diameter of an internally splined cylindrical member;

Fig. 6 is a detached view of the gage of Figure 5 as the gage would appear looking down from the top in Figure 5 with the work piece removed; and Fig. 7 is a cross-sectional view taken on the line 7—7 of Figure 5.

Figure 1:
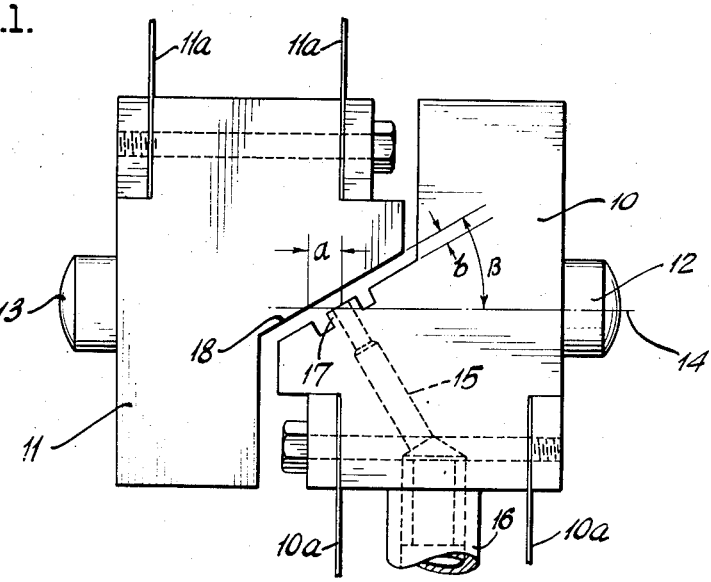
Fig. 1 is a view of a simple form of apparatus illustrating the basic elements of an air gage nozzle with its axis and the air impinging surface each arranged at an acute angle to the direction of the dimension to be measured.

Referring to Figure 1 which embodies certain basic elements in a simple form, there is shown a gage having supporting blocks or bodies 10 and 11 provided with contact buttons 12 and 13 respectively, the device being adapted to measure the dimension between a surface or surfaces contacted by the buttons. The bodies 10 and 11 are normally urged apart in the direction of the line 14 by suitable elastic means such as the reed type supporting springs 10a and 11a respectively. That is, the blocks are suspended at the ends of these reed type springs the opposite ends of which are held in fixed position. The block 10 is provided with a fluid conduit 15 connected through a flexible pipe 16 with a source of elastic fluid such as air. The conduit 15 connects with an escape nozzle 17. The body 11 is provided with a reference surface 18 opposed to the nozzle 17 against which air impinges in escaping from the nozzle 17. As indicated, the reference surface 18 is arranged at an angle B with respect to the line 14 comprising the normal direction of relative movement between the bodies 10 and 11. In the relative positions shown the nozzle is spaced from the reference surface 18 by a distance $b$. It will be noted, however, that to produce a spacing $b$ the bodies 10 and 11 and correspondingly the nozzle 17 and its reference surface 18 are moved apart an absolute distance indicated at $a$. Therefore, the spacing $b$ between the nozzle and its reference surface varies as the sine function of the angle B rather than in direct proportion to the absolute movement of the contact buttons 12 and 13 and the corresponding bodies supporting 10 and 11. The movements will always be in proportion but the variation in the spacing between the nozzle and its reference surface will always be less than the absolute movement. In simple terms, the ratio will be that of the dimension $b$ to dimension $a$. By altering the magnitude of the angle B, any ratio desired may be selected within reasonable limits, the smaller the angle B the greater the amount of reduction and the greater the tolerance range.

It will be understood that the conduit 16 is connected to a source of elastic fluid which embodies therein an indicator means. Any suitable apparatus may be employed for the purpose. A particular practical form of such an indicator means, however, is disclosed in the prior Patent No. 2,513,374 of which I am the patentee jointly with Clifford Stead.

Figure 4:
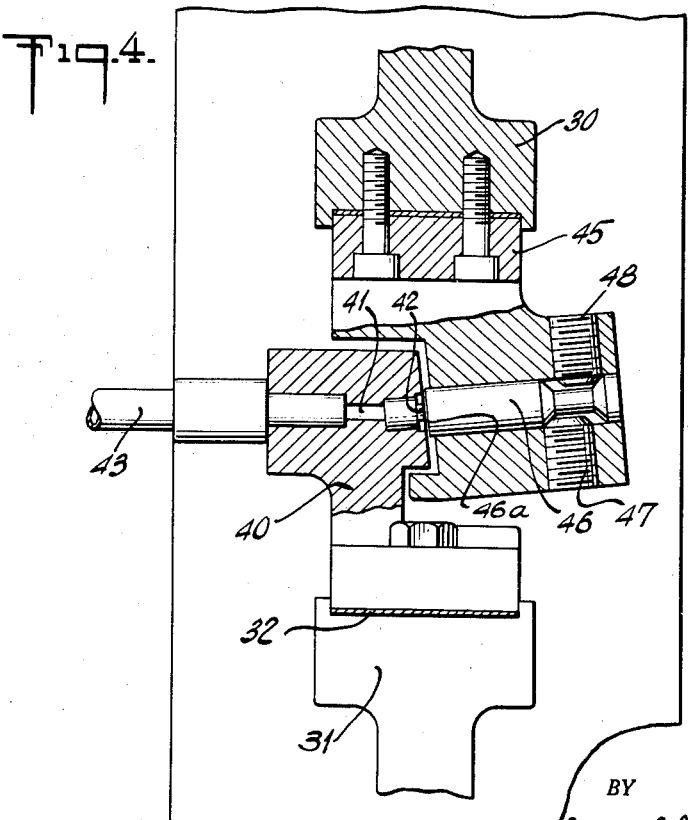
Fig. 4 is a fragmentary view of the mid portion of the apparatus of Figure 3 on an enlarged scale.

A more detailed particular application of the principles of the invention is shown in the device of Figures 2, 3 and 4 which embodies a gage head 20 adapted to gage the internal bore of a cylindrical work piece 21. The gaging head 20 is mounted on a supporting handle 22 which has extending therethrough a fluid conduit leading from a source of supply, the conduit including a pipe 23. The gaging element includes a main drum 24 secured to a base plate 25. The gage may also have a cover plate 26 secured to the base plate 25 through the medium of spacer tubular members 27 to which the plate 26 is secured by screws 28.

Located interiorly of the drum 24 is a pair of blocks 30 and 31 each supported on reed type springs, the support for block 31, for example, comprising the spaced springs 32 to the outer free ends of which is secured the block, the inner end of the springs, at the right in Figure 2, being held in fixed position in a block 33 clamped to the base plate 25 by a pair of set screws 34, the position of the block 33 being partly determined by dowel pin 35. The block 30 is similarly supported. Each of the blocks 30 and 31 is provided with a contact button, indicated at 30a and 31a, each projecting radially outward through a slot in the drum 24 indicated at 37 and 38 respectively.

As shown more clearly in the enlarged fragmentary view of Figure 4 the inner end of the block 31 has secured thereto a bracket 40 which has therein a fluid conduit 41 leading to the nozzle 42, the conduit 41 being connected through a section of flexible tubing 43 (Fig. 3) with the central conduit 44 leading from the supply pipe 23. Referring again to Figure 4 the block 30 has secured to its inner end a bracket 45 having a bore in which is mounted the cylindrical member 46 having a flat inner surface 46a comprising a reference surface for the outlet nozzle 42. An initial adjustment of the position of the reference surface 46a may be effected by appropriate adjustment of the studs 47 and 48 screw-threaded in the bracket 45 as shown in Figure 4.

It will be apparent that any given radial movement of the contact buttons 30a and 31a and their corresponding blocks 30 and 31 will produce a considerably reduced change in the spacing between the outlet of nozzle 42 and its reference surface 46a. Therefore, any variation in the dimension of the object being measured such as the bore of the work piece 21 will produce a much reduced change in the space at the end of the nozzle 42, and the tolerance range of the gage will be considerably enlarged over that possible if the nozzle and its reference surface were arranged in a plane perpendicular to the direction of absolute movement of the contact buttons.

In connection with the gage means of Figs. 2 to 4 it is noted that the location of the support for the reeds 32 relative to the corresponding blocks or members 30 and 31 suspended thereon is such that the plane of movement of the reeds and suspended members is parallel to the axis of the gage and the bodily movement of the blocks toward or from the fixed supports for the reeds as a result of swinging in an arc is in a direction parallel to the inclined reference surface 46a so that such bodily movement does not affect the spacing between the nozzle and its reference surface. In Figures 3 and 4 this plane of movement is perpendicular to the plane of the paper. The only relative movement or component which affects the spacing at the nozzle outlet is that in the direction of the line of measurement corresponding in Figs. 2 to 4 to an internal diameter of the work piece 21. The plane of movement of the suspended members such as the block 30 and its associated reference surface 46a may also be defined as parallel to a line in the reference surface which is normal to the line of measurement, for example, in Figure 4, a line in the surface 46a perpendicular to the plane of the paper and to the line of measurement comprising a diameter of the work piece.

The embodiment of the invention shown in Figures 5, 6 and 7 comprises a plug type gage 51 adapted to measure the pitch diameter of the teeth 52 located internally of the drum type part 53. The gage includes a base portion 54 having an annular shoulder adapted to engage against the end surface of the work piece 53 and a reduced cylindrical supporting body 55 having longitudinal slots in the periphery thereof in which are located the reeds 56 and 57 carrying the radially projecting contact buttons 56a and 57a respectively. The reeds each have an enlarged block portion such as that shown at 58 for the reed 56 whereby the reed may be clamped to the body of the gage in the respective slot by means of set screws 59. The particular gage shown in Figures 5 to 7 is designed for measuring the pitch diameter of an internally splined part and the outer plate 60 secured to the outer end of the body 55 may have suitable fingers such as indicated at 61 for locating the gage relative to the splines. Also, depending upon the arrangement of the internal teeth of the work piece, the contact buttons may be at a selected angle to each other peripherally, as indicated particularly in Figure 7, and not necessarily diametrically opposed.

In the gage of Figures 5 to 7 each contact button has associated therewith its own nozzle and reference surface means as indicated particularly in Figure 7. Accordingly the supply conduit 65 extending longitudinally of the shank of the gage has branch conduits 65a and 65b leading to the respective nozzles 66 and 67. Referring to the reed 56 as indicated particularly in Figure 7 the outer free end of the reed is provided with an enlarged head 68 which has an inclined reference surface 68a opposed to the outlet nozzle 66. It will be apparent in accordance with the discussions in connection with the previous devices that any radial movement of the contact button 56a will produce a very much reduced change in the space between the nozzle 66 and its opposed surface 68a with a corresponding increase in the tolerance range of the gage. Similarly to the arrangement of the gage shown in Figures 2 to 4 the reeds 56 and 57 of the gage shown in Figures 5 to 7 are so supported and arranged that the plane of movement of the respective reed and its suspended member is such that the component thereof longitudinally of the gage, that is toward or away from the fixed supporting part 58, is in a direction parallel to the reference surface 68a and has no effect on the spacing between the reference surface and its nozzle. In the particular gage of Figures 5 to 7 the two nozzle means are connected to a common supply conduit 65 which in turn is connected to a common indicator and the variation in the pitch line dimension or whatever dimension is being measured between the contact buttons will be measured as the sum of the clearances or spaces produced at the two nozzles.

It will be understood that the devices as shown in the drawings and described above are illustrative applications of the principle of the invention and that the details of the mechanism may be varied to adapt the invention to other specific apparatus and uses. Accordingly it is intended that all matter contained in the above description or shown in the accompanying drawings shall be interpreted as illustrative and not in a limiting sense.

I claim:

1. In a wide tolerance fluid gage apparatus, a first member having therein a fluid conduit for receiving fluid from a source of supply and an outlet nozzle, a second member having an opposed plane reference surface against which fluid escaping from said nozzle impinges, one of said members being mounted for movement in a direction toward or from the other and having a contact element for engaging the surface to be gaged and thereby determining the amount of said movement, said reference surface being inclined at an acute angle to said direction of movement, the mounting for said movable member comprising a flat reed spring secured at one end to the member and having its opposite end secured in a fixed support, the location of the support and direction of extent of the reed therefrom with respect to said nozzle and its reference surface being such that the bodily movement of the suspended member toward or from the fixed support as a result of swinging in an arc on the reed is in a direction parallel to said reference surface and the amount of spacing between the reference surface and the nozzle is unaffected thereby.

2. In a wide tolerance fluid gage apparatus, a first member having therein a fluid conduit for receiving fluid from a source of supply and an outlet nozzle, a second member having an opposed plane reference surface against which fluid escaping from said nozzle impinges, one of said members being mounted on spring suspension for movement relative to the other and having a contact element for engaging the surface to be gaged and thereby determining the amount of said relative movement in the direction of the line of measurement, said reference surface being inclined at an acute angle to said direction of the line of measurement, the mounting for said movable member comprising a flat reed spring secured at one end to the suspended member and having its opposite end secured in a fixed support, the position of the support and reed spring being such that the plane of movement of the suspended member is parallel to a line in said reference surface which is normal to the line of measurement whereby the amount of spacing between the reference surface and the nozzle is independent of the effect of the suspended member's swinging in an arc.

3. In a wide tolerance fluid gage apparatus, a first member having therein a fluid conduit for receiving fluid from a source of supply and an outlet nozzle, a second member having an opposed plane reference surface against which fluid escaping from said nozzle impinges, at least one of said members being mounted on spring suspension for movement relative to the other and having a contact element for engaging the surface to be gaged and thereby determining the amount of said relative movement in the direction of the line of measurement, said reference surface being inclined at an acute angle to said direction of the line of measurement, the mounting for the movable member comprising in each case flat reed spring means secured at one end to the suspended member and having the opposite end secured in a fixed support, the position of the support and direction of extent of the reed spring means being such that the component of movement in the plane of arcuate movement of the suspended member toward or from the support is in a direction parallel to said reference surface whereby the amount of spacing between the reference surface and the nozzle is determined solely by the component of movement in the direction of the line of measurement and is independent of the effect of the suspended member's swinging in an arc.

References Cited in the file of this patent
UNITED STATES PATENTS 2,623,294    Fox ------------------ Dec. 30, 1952

FOREIGN PATENTS 285,817    Switzerland ------------ Jan. 16, 1953